June 6, 1967 P. J. MARAS 3,323,185
SLIDING LOGGING HOOK
Filed Oct. 18, 1965 3 Sheets-Sheet 1

PERCY J. MARAS
INVENTOR.

BY *[signature]*

ATTORNEYS

June 6, 1967 P. J. MARAS 3,323,185
SLIDING LOGGING HOOK
Filed Oct. 18, 1965 3 Sheets-Sheet 3
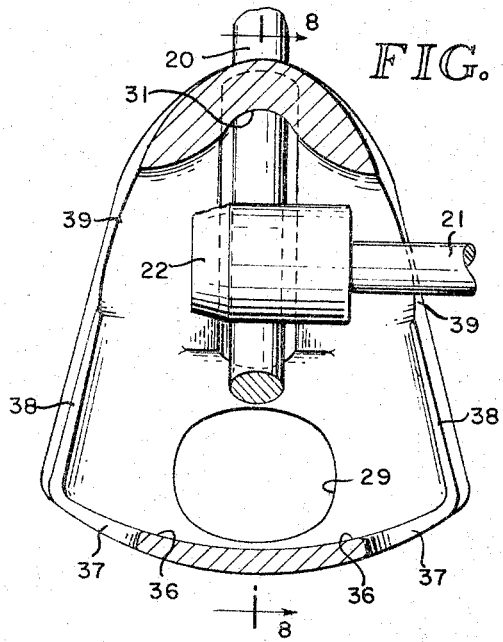
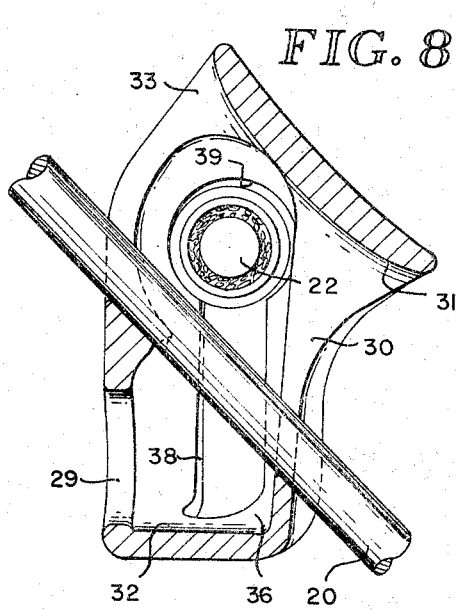
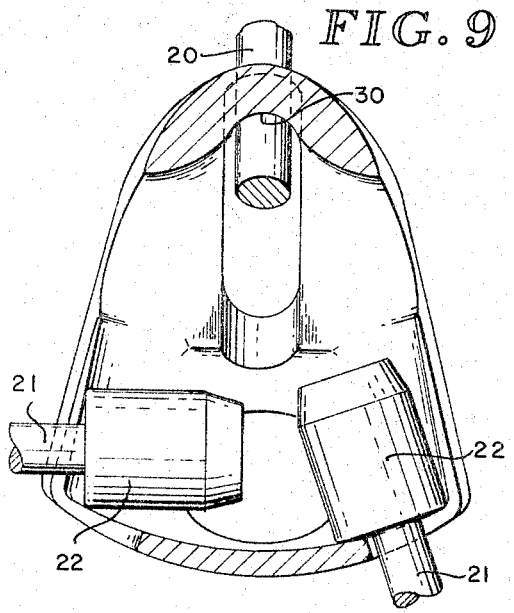
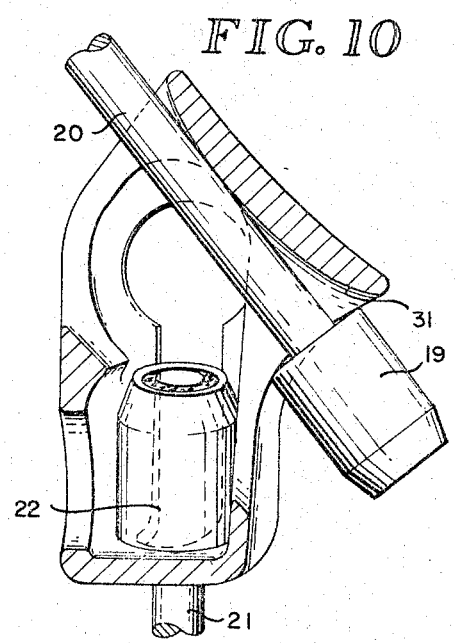
PERCY J. MARAS
INVENTOR.
BY *Seed & Berry*
ATTORNEYS

United States Patent Office 3,323,185
Patented June 6, 1967

3,323,185
SLIDING LOGGING HOOK
Percy J. Maras, Buckley, Wash., assignor to Garrett
Enumclaw Co., a corporation of Washington
Filed Oct. 18, 1965, Ser. No. 497,202
6 Claims. (Cl. 24—123)

This invention relates to improvements in sliding logging hook, and namely the type of hook which serves as a connection between a choker line and a winch line. It is the usual practice to have a plurality of the hooks reeved upon the winch line so that a number of logs can be handled in each drag operation. For a practical logging operation, it is necessary that the choker lines be detachably associated with the reeved hooks, and this is usually accomplished by fitting the inner end of each choker line with a ferrule and providing in the hook a key-hole opening leading to a socket in which the ferrule is lodged. In order to preclude the ferrules from becoming accidentally dislodged, most sliding logging hooks are designed so that the inner end of the choker line must be manipulated in a prescribed manner in order to enable the ferrule to be either inserted in or taken out of the socket. It is self-evidently important that the manipulative movements which insertion and removal require be simple, that they be of a character which can be quickly and easily performed, and that the movements be such that there is modicum liability of the same being accidentally duplicated during a log-dragging operation.

It is one object of the present invention to provide a sliding logging hook in which the manipulative movements which are required in order to insert and remove the ferrule are unusually simple, can be performed quickly and easily, and which are substantially precluded from being duplicated in the course of a drag operation.

A further important object is to devise a sliding logging hook which may be said to be "two-in-one" in the sense that a single reeved hook is enabled to handle two choker lines.

As a yet further object, the invention aims to provide a sliding logging hook having its socket so designed that a ferrule lodged therein is free to pivot and thereby obviates kinking of an attached choker line when erratic motion of a log causes the choker line to be swung into a position where it extends laterally from the hook.

The above and yet additional objects and advantages in view will appear and be understood in the course of the following description and claims. The invention consists in the novel construction and in the adaptation and combination of parts hereinafter described and claimed.

In the accompanying drawings:

FIGS. 7 through 10 are vertical sectional views including fragmentary illustrations of winch and choker lines in various positions.

Figure 1:
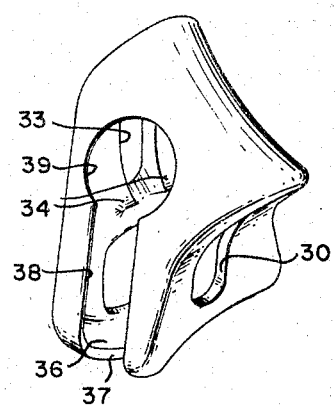
FIGURE 1 is a perspective view portraying a sliding logging hook constructed to embody preferred teachings of the present invention.
Figure 2:
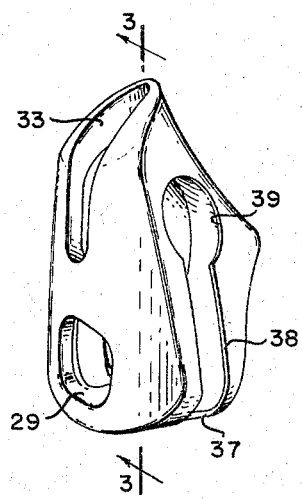
FIG. 2 is a perspective illustration viewed from a different vantage point.
Figure 3:
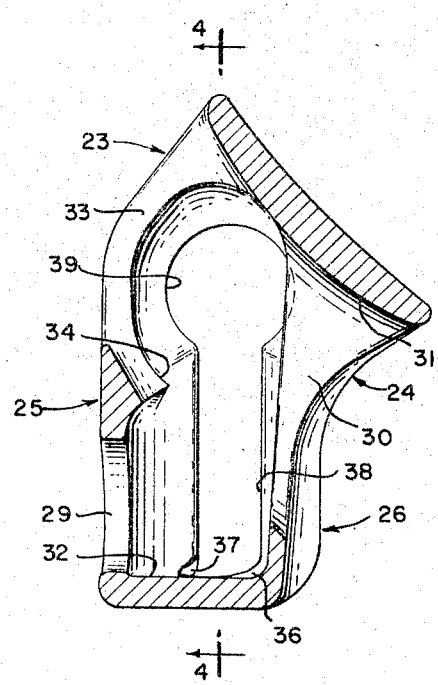
FIG. 3 is a longitudinal vertical sectional view drawn to a larger scale on the line 2—2 of FIG. 2.
Figure 4:
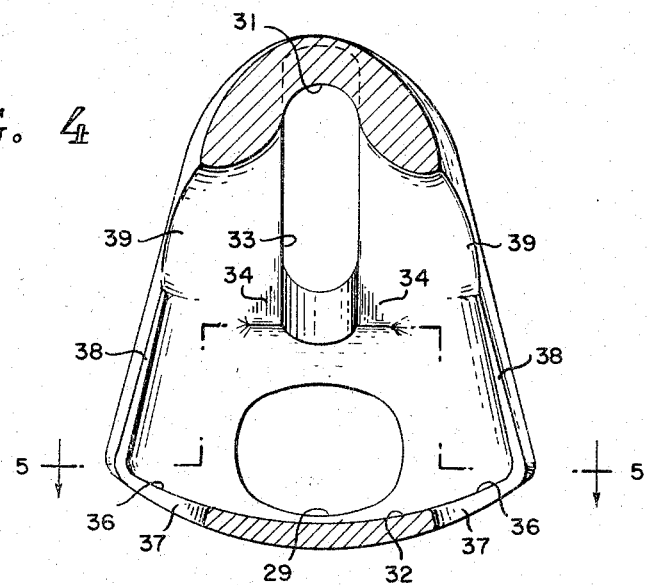
FIG. 4 is a transverse vertical sectional view on line 4—4 of FIG. 3.
Figure 5:
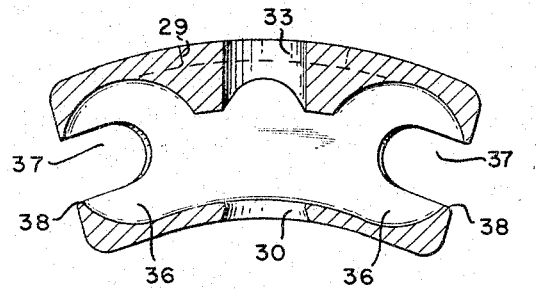
FIG. 5 is a horizontal sectional view on jogged line 5—5 of FIG. 4.
Figure 6:
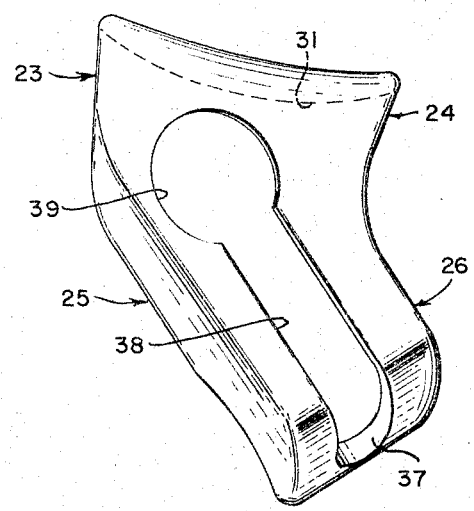
FIG. 6 is a side elevational view of the block shown in much the position which it occupies when in use.

The sliding hook of the present invention is designed primarily for use in attaching choker lines to a winch line. The winch line is here denoted by the numeral 20 and customarily has a diameter somewhat larger than that of the choker lines 21. The end of the choker line which attaches to the hook has a ferrule 22 fixed thereto. This ferrule is adapted to be lodged in a stall which the hook provides. The outer end of the winch line also customarily has a ferrule 19 fixed thereto. This latter ferrule shoulders against the back wall of the outermost one of the several hooks which are reeved on the winch line.

The present hook is cast as a unitary body with a hollow interior which is devoid of any partitioning walls and having openings in the front, back, bottom, and both sides leading to said hollow interior. Viewed from the side and considered in profile the body has somewhat of an elbow shape in that a plane occupied by the upper edge is cocked relative to a plane occupied by the lower edge. The upper edge is made slightly concave and is considerably longer than the lower edge.

Front and back walls 23 and 24 for an upper part of the elbowed body parallel one another and lie more or less perpendicular to the plane in which said upper edge lies. Front and back walls 25 and 26 for a lower part of the elbowed body likewise parallel one another and are more or less perpendicular to the plane in which the body's lower edge lies. The body flares outwardly from top to bottom so that, viewed from the front or back, the same is sectoral in shape. When viewed from the ends, both the wall 23 and the wall 25 are convex, and walls 24 and 26 are concave. These convex and concave curvatures, in the instance of the walls 25 and 26, are desirably developed on the arcs of concentric circles.

Proceeding now to describe the several apertures which give access to the hollow interior, the aperture 30 which is provided in the back wall of the body has a width moderately wider than the diameter of the winch line and extends vertically on the median line of the body from the ceiling 31 to a point closely adjacent to the floor 32. The aperture 33 in the front wall has a similar diameter and likewise is located on the median line of the body, extending downwardly from the ceiling with a length much the same as the aperture 30. Below the lower end of the aperture 33 an opening 29 is provided to allow escape of collected dirt and mud. In the normal use of the hook the relationship with the winch line is as shown in FIGS. 9 and 10, i.e., hanging frame the winch line so that the latter bears against the ceiling, said ceiling and the upper ends of the apertures 30 and 33 thus producing the reeveway for such winch line. For the purpose which will hereinafter appear, the hook may be manually raised to the position shown in FIGS. 7 and 8, so that the winch line seats against the lower ends of the apertures 30 and 33.

Interiorly of the body the front wall presents a respective nubbin 34 at each side of said low end of the aperture 33. Said nubbins are spaced above the floor 32 a distance somewhat greater than the axial lengths of the ferrules 22.

There are two stalls for these ferrules, each located so that its axial center occupies a plane paralleling a respective side of the body and placed midway between said side and an adjacent one of the two nubbins. The two stalls, each moderately larger than the diameter of the ferrule, have no intervening wall. The front and back walls of the one merge with those of the other. At the bottom there is provided a ledge 36 of U-shape to take the thrust of the socketed ferrule. The ledge is defined by a radial slot 37 prolonged inwardly from the shank section 38 of a key-hole aperture provided in the related side wall of the body. The width of this shank and its prolongation 37 is slightly larger than the diameter of the line 21 to which the ferrule 22 is attached. The eye 39 of the key-hole aperture is slightly larger than the diameter of such ferrule and occupies a position between paralleling planes one occupied by the ceiling 31 and the other containing the two nubbins 34.

The ferrules are inserted in the stalls by first raising the body so that the winch line bears against the seat which the lower ends of the elongated front and back apertures provide. A ferrule 22 is then tipped so that it can be fed through the eye of a respective one of the two key-hole openings into the position in which it is shown in FIGS. 7 and 8. The ferrule is now rolled over the related nubbin and fed into its socket by swinging the choker line 21 downwardly through the shank opening 38 into the slot 37. The procedure is repeated for the other ferrule, after which the winch line is freed so that the body occupies its normal position seated in the reeve-way. So positioned, the winch line performs the function of a gate, precluding accidental dislodgment of the ferrules from the body in that it occupies an obstructive position precluding the ferrules from moving into the FIG. 7 position which they must occupy in order to be inserted to or removed from the body. In FIGS. 9 and 10 one of the two ferrules is shown occupying the normal position within its socket. FIG. 9 also indicates the manner in which either or both ferrules are free to swing within their sockets.

It will be apparent that a hook within the concept of the present invention could be readily designed to provide only a single socket and thus adapt itself to use as a choker hook. Having this and other changes in mind, it is my intention no limitations be implied and that the hereto annexed claims be given the broadest interpretation to which the employed language fairly admits.

What I claim is:
1. A logging hook for use in attaching a choker line to a winch line, the choker line having a ferrule upon the end thereof which is to be attached, said hook comprising a hollow body producing an interior chamber formed in the ceiling with a groove running front to back and serving as a reeve-way for the winch line, the groove being exposed at each of the two ends to the upper end of a respective one of two vertical slots formed one in the front wall and the other in the back wall of the body, said slots accommodating the winch line and having a length such that when the winch line is lowered from a normal position occupying the reeve-way to a seat at the lower limit of the slots there is provided within the body above said winch line a pocket of a size to permit the ferrule to lie approximately horizontally therein, the body being so formed that below and to one side of said lowered winch line there is provided a stall of a size to permit the ferrule to lie approximately vertically therein and above said stall there is provided a way through which the ferrule can be passed from the pocket to the stall, the bottom wall of the body presenting a U-shaped ledge upon which the ferrule seats when it occupies the stall, the side wall of the body on the stall side being formed with a key-hole aperture the eye of which accommodates the ferrule and lies coaxial with said pocket and the shank of which accommodates the choker line and extends downwardly on the approximate median line of the side wall from the eye to the bottom end of the side wall and thence inwardly into the bottom wall to give said ledge its U-shape, the winch line when occupying its normal operating position performing an obstructive function precluding the ferrule from occupying the pocket.

2. Structure according to claim 1 in which the body is so formed that the ferrule is free to rock, about the inner edge of its base as a fulcrum, between said vertical position and an approximate horizontal position should the choker line be subjected during a log-dragging operation to an influence tending to swing the line outwardly from the hook.

3. Structure according to claim 1 in which the body is formed so that a respective one of said stalls lies to each side of the lowered winch line and having for each of said stalls a respective way through which a respective one of two ferrules are passed to the stall from a single said pocket common to both, a respective one of said key-hole apertures being provided in each side wall.

4. Structure according to claim 3 in which the body has an elbowed configuration when viewed from the side with the axial lines of the stalls pointing in a rearward direction diagonally downwardly and outwardly when the reeve-way is disposed horizontally.

5. Structure according to claim 3 in which nubbins protrude inwardly from the front wall of the body at each side of the lower end of the concerned slot, each giving definition to a respective one of the two passage-ways and being spaced above the ledge a distance exceeding the length of the ferrules.

6. Structure according to claim 3 in which a communicating space is provided between the two stalls and into which both ferrules are free to rock, about their inner edges as a fulcrum, from normal generally vertical positions into approximately horizontal positions should the choker lines be subjected during a log-dragging operation to an influence tending to swing the line outwardly from the hook.

References Cited
UNITED STATES PATENTS 1,897,920 2/1933 Wilson.
2,828,156 3/1958 Hansen.
3,276,809 10/1966 Vaines.

BERNARD A. GELAK, *Primary Examiner.*